Dec. 22, 1964  M. MARKMAN  3,162,408
FISHING ROD AND TROLLING POLE HOLDER
Filed March 4, 1963  3 Sheets-Sheet 1
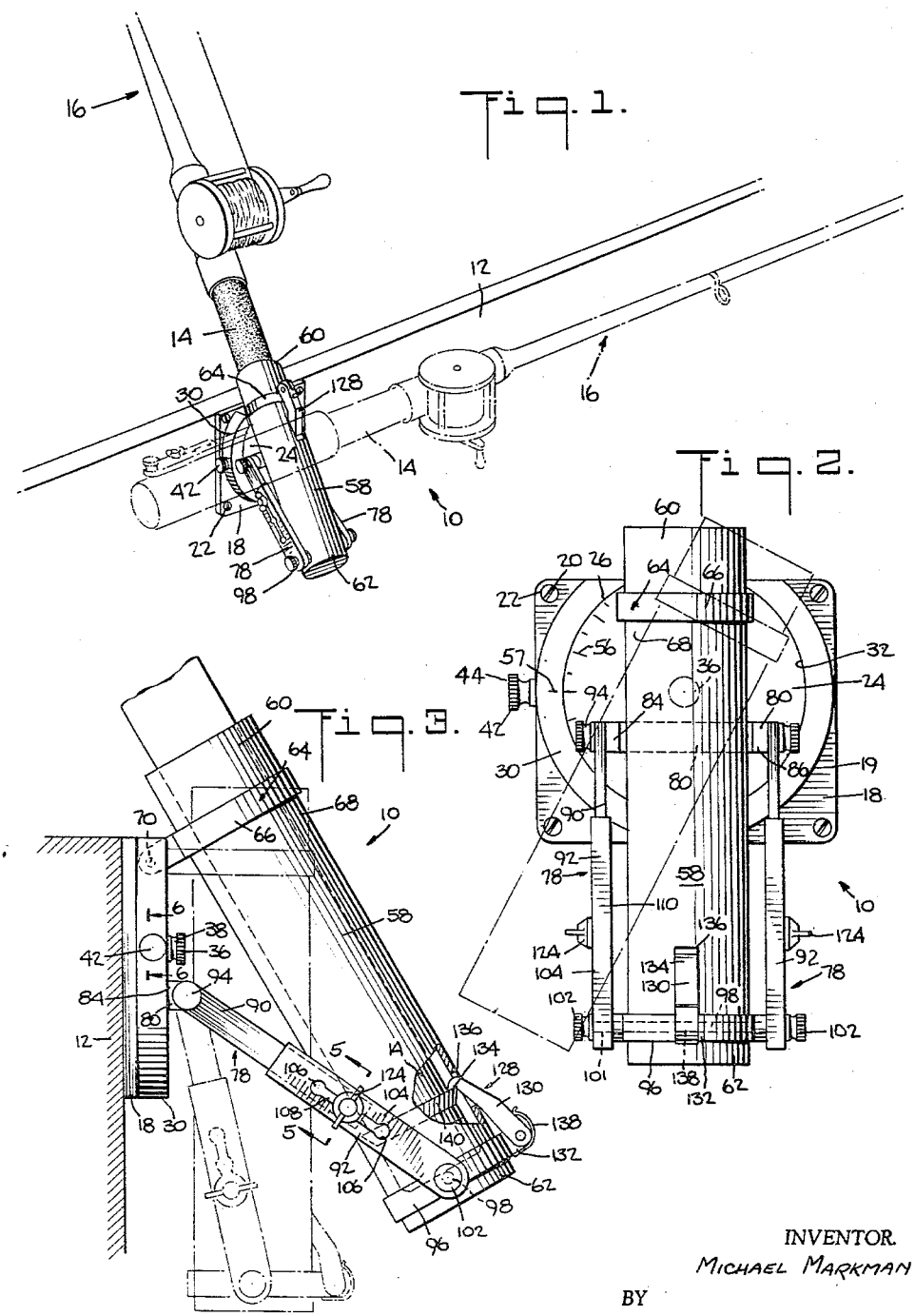
INVENTOR.
MICHAEL MARKMAN
BY
Kirschstein, Kirschstein & Ottinger
ATTORNEYS Dec. 22, 1964    M. MARKMAN    3,162,408
FISHING ROD AND TROLLING POLE HOLDER
Filed March 4, 1963    3 Sheets-Sheet 2
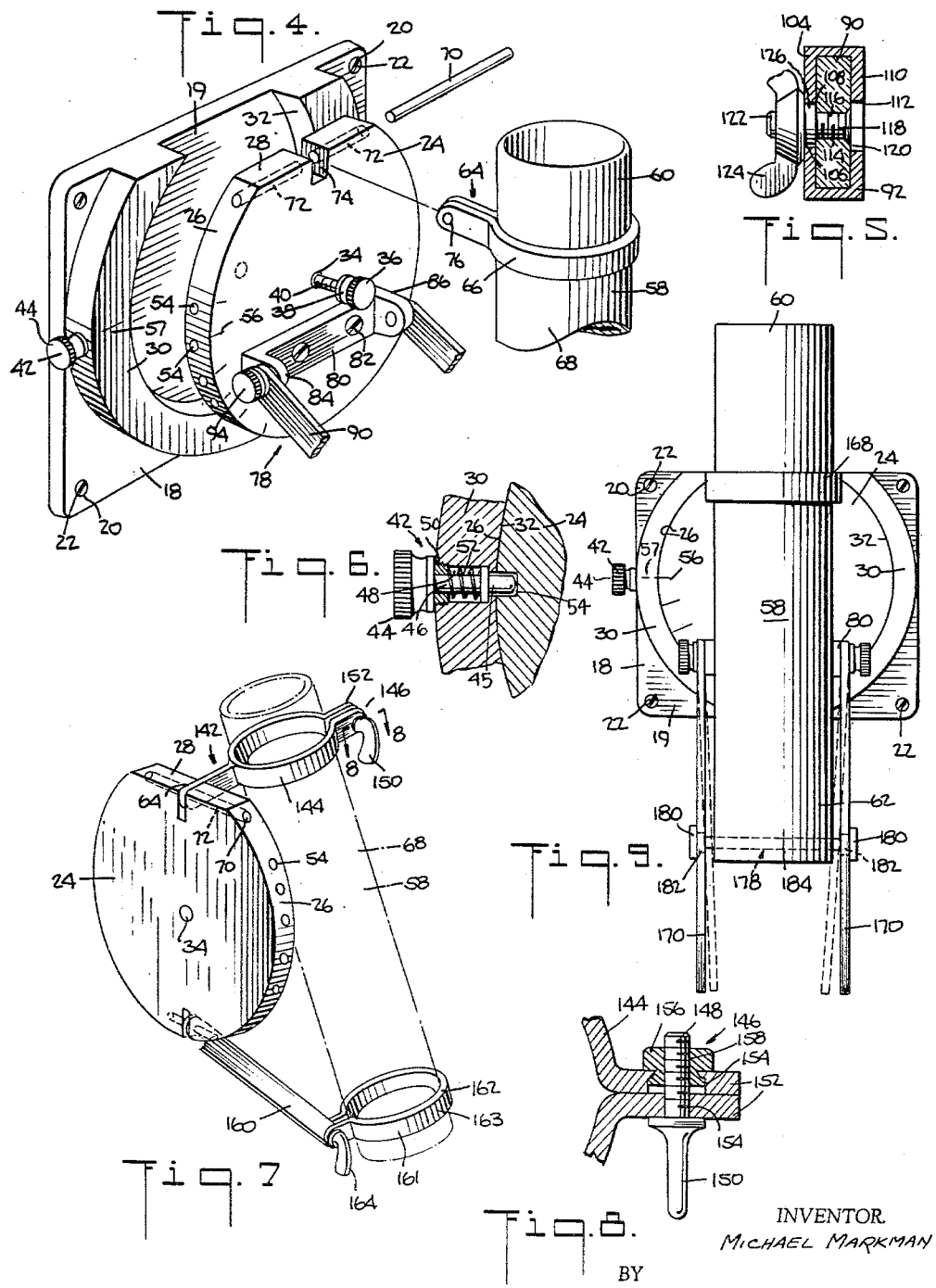
INVENTOR.
MICHAEL MARKMAN
BY
Kitschstein, Kitschstein & Ottinger
ATTORNEYS

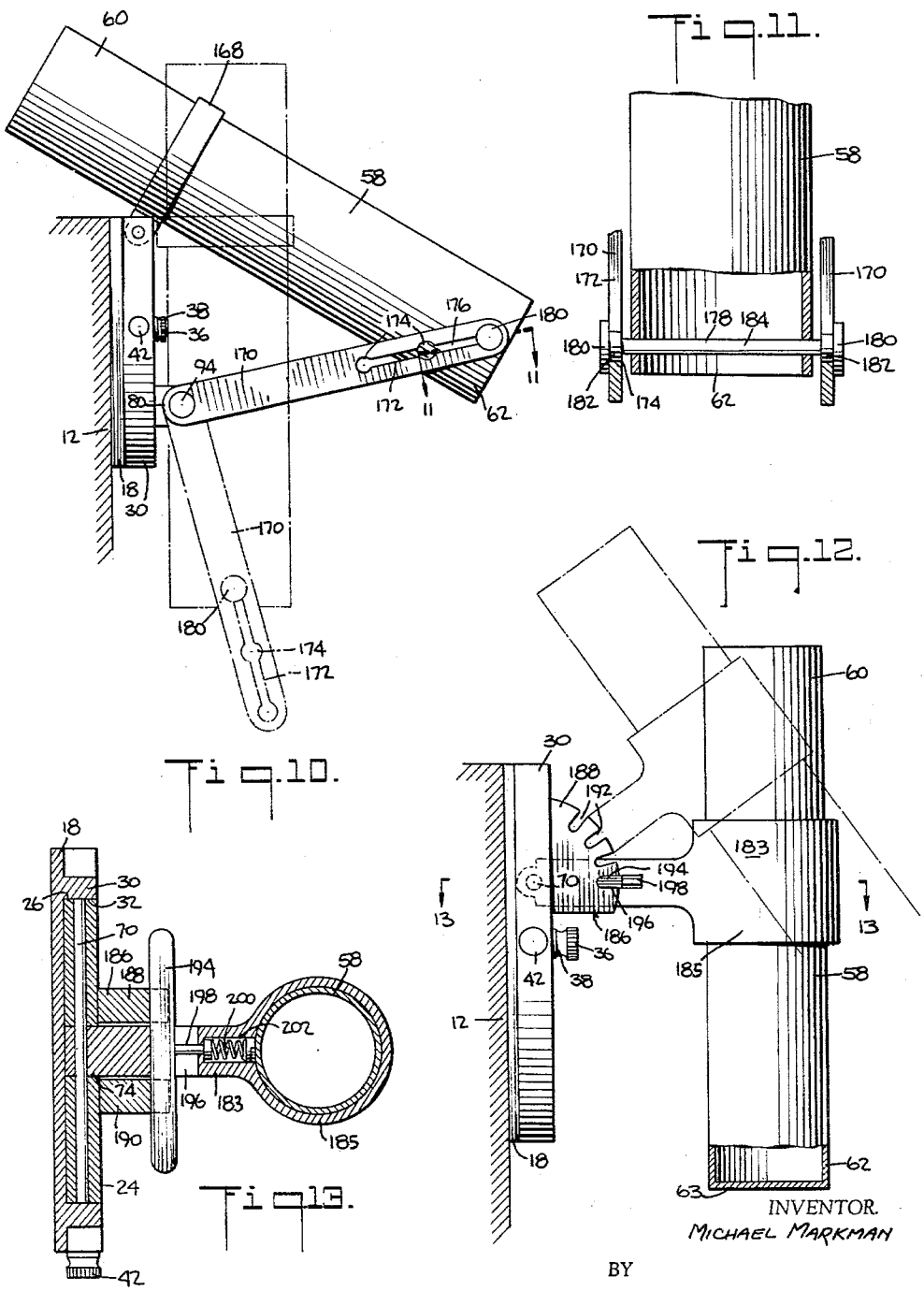

United States Patent Office 3,162,408
Patented Dec. 22, 1964

3,162,408
FISHING ROD AND TROLLING POLE HOLDER
Michael Markman, 225 W. 86th St., New York 24, N.Y.
Filed Mar. 4, 1963, Ser. No. 262,582
2 Claims. (Cl. 248—40)

This invention relates to a fishing rod and trolling pole holder.

It is an object of this invention to provide an improved holder for fishing rods and trolling poles adapted to support such a rod or pole on a boat in a wide variety of desirable angular positions in relation to such boat, and, also to hold the same in a storage position when the rod is not in use.

It is a further object of my invention to provide a holder of the character described which allows quick and convenient adjustment of the rod or pole to different positions without the necessity of using tools, but which, when adjusted, firmly holds its position. Such ease of use should continue under adverse weather conditions, as well as after extended exposure to conditions at sea.

It is another object of my invention to provide a holder of the character described which is rugged and strong in construction, durable, corrosion resistant, and not prone to accidental displacement.

It is a further object of my invention to provide a holder of the character described which is convenient for use with a wide variety of fishing poles, but which is particularly adapted for use with heavy fishing rods and trolling poles of the type used in deep sea fishing. My holder may be mounted in any desirable location on a boat structure, but has particular value in being mounted in a vertical position on an interior upstanding wall of a boat.

It is another object of my invention to provide a holder of the character described which has a minimum of parts, is simple and economical to manufacture and which is pleasing and attractive in appearance.

Other objects of my invention in part will be obvious and in part will be pointed out hereinafter.

My invention accordingly consists in the features of construction, combinations of elements and arrangements of parts which will be exemplified in the holders hereinafter described and of which the scope of application will be indicated in the appended claims.

In the accompanying drawings in which are shown various possible embodiments of my invention, FIG. 1 is a perspective view of one embodiment of my fishing rod and trolling pole holder mounted on a bulwark (coaming) of a boat and supporting a fishing rod;

FIGS. 2 and 3 are front and side views of the holder shown in FIG. 1;

FIG. 4 is an enlarged and exploded front perspective view of the base and support plate of my holder;

FIGS. 5 and 6 are enlarged cross-sectional views taken substantially along the lines 5—5 and 6—6, respectively, of FIG. 3;

FIG. 7 is a rear perspective view of a portion of a holder embodying a second form of my invention;

FIG. 8 is an enlarged fragmentary cross-sectional view taken substantially along the line 8—8 of FIG. 7;

FIG. 9 is a front view of a holder embodying another form of my invention;

FIG. 10 is a side view of the holder shown in FIG. 9;

FIG. 11 is an enlarged fragmentary cross-sectional view taken substantially along the line 11—11 of FIG. 10;

FIG. 12 is a side view of a holder embodying still another form of my invention; and FIG. 13 is a horizontal cross-sectional view of the holder shown in FIG. 12, the same being taken substantially along the line 13—13 of FIG. 12.

Referring now in detail to the drawings, the reference numeral 10 indicates one embodiment of my fishing rod and trolling pole holder. FIG. 1 shows the holder 10 mounted on the interior face of an upstanding wall 12 (bulwark or coaming) of a boat and supporting the handle 14 of a fishing rod 16. As shown in solid lines the holder 10 is supporting the rod so that it extends over and beyond the wall 12 and as shown in dot-and-dash lines the holder is supporting the rod in a storage position adjacent and alongside the interior side of said wall. The several parts of the holder are formed from any strong, non-corrosive metal as bronze, stainless steel and the like.

The holder includes a vertical support plate 18 adapted to be secured in inboard position to a vertical boat structure such as a bulwark. The support plate is flat and rectangular, has an outer (exposed) face 19, and has apertures 20 in each of its corners by which screws 22 can fasten the plate 18 to the vertical wall 12 of the boat.

Means is provided for mounting a base 24 on the support plate 18 for rotation about a fixed horizontal axis perpendicular to the vertical plane of the support plate 18. The base 24 is flat and has a cylindrical side (peripheral) wall 26, as best seen in FIG. 4. The side wall 26, although cylindrical for the greater part of its length, has at its top a horizontal straight truncated portion 28 which is provided for reducing the height of the plate and base in upright position in order that such parts do not interfere with the movement of the rotatable members mounted thereon.

The mounting means for the base 24 includes a guide wall 30 fixed on, e.g. unitary with, the inboard face 19 of the support plate 18. The guide wall protrudes outwardly from the support plate and has a cylindrical interior bearing face 32 which has a diameter that matches the outer diameter of the cylindrical side wall 26 of the base. The guide wall 30 is continuous for its length, except for a short horizontal gap coincident with the top edge of the support plate to minimize its height as aforesaid. The interior bearing face 32 of the guide wall thus defines a major segment, i.e. more than half the circumference, of a cylinder, which when the holder 10 is mounted in a vertical position, as is intended, has a horizontal axis of symmetry.

The base 24 is provided with a central through bore 34 coincident with its axis of symmetry. A shaft 36 extends through this bore and is affixed to the support plate 18 to rotatably secure the base 24 to the support plate. The shaft 36 includes a knurled manually manipulatable head 38 and a threaded shank 40 unitary with the head. A tapped aperture (not shown) is located in the outer (inboard) face 19 of the support plate 18 and is coincident with the axis of symmetry of the cylindrical interior face 32 of the guide wall 30. The head 38 of the shaft 36 is disposed on the inboard side of the base 24 and the shank 40 extends through the bore 34 in the base 24 and is threaded into the tapped aperture in the support plate 18.

As previously noted, the side wall 26 of the base 24 has a diameter which matches the diameter of the interior bearing face 32 of the guide wall so that when the shaft 40 holds the base 24 adjacent to the support plate 18, the base is mounted for rotatable slidable engagement within the interior cylindrical face 32 of the guide wall 30.

When thus mounted the base 24 can rotate about a fixed horizontal axis perpendicular to the vertical plane of the support plate 18.

First manually operable lock means is provided to selectively fix the angular relationship of the base 24 to the support plate 18. This means includes a manually operable pin 42 carried by the base 24 and mounted for slidable movement on said base between a first position locking the base to the support plate and a second position allowing rotation of the base relative to the support plate. The pin 42 has a knurled head 44 disposed on the exterior face of the guide wall 30 and a shaft 46 unitary with the head. The construction of this means can best be seen in FIG. 6. The pin 42 is mounted in a radially disposed through aperture 48 in the guide wall 30.

The aperture 48 is of smaller diameter proximate to each of its ends. These smaller diameters slidably match the diameter of the shaft 46, and are provided on one end having the aperture 48 of smaller bore and on the other end by an insert 50 threaded into the outer end of the aperture 48. The intermediate portion of the aperture 48 contains a helical spring 52 compressed between the insert 50 and a collar on the pin and biasing the pin 42 towards the base 24.

The side wall 26 of the base 24 has several indents 54 having a diameter that slidably matches the diameter of the tip 45 of the shaft 46 of the pin 42. Each indent 54 will successively be in registry with the tip 45 of the shaft 46 as the base 24 is rotated relative to the support plate 18. The spring 52 urges the tip 45 of the shaft 46 into any selected indent 54 brought into registry with the shaft, so as to lock the base 24 relative to the support plate 18. When the head 44 of the pin 42 is pulled away from the guide wall 30 against the force of the spring 52, the tip 45 is clear of the indents 54 so as to allow rotation of the base 24 relative to the support plate 18. Index lines 56 are provided on the base 24 and a marker line 57 on the guide wall 30 for convenience in aligning these parts to any desired position.

An elongated tube 58 having an open end 60 and a blocked end 62 is provided to receive the rod handle 14. The end 62 may be blocked by a rod transversely disposed interior of the tube at such end, as will be later described, or by a plate 63 sealing such end, as seen in FIG. 12. The tube is of a sufficient diameter to accommodate most conventional rods and is of sufficient length to seat the rod handle deeply within it.

Means is provided to mount the tube 58 on the base 24 for pivotal movement about an axis parallel to the vertical plane of the support plate 18 and within the base 24. This means includes a hinge 64 fixedly secured at one end to the tube 58 and rotatably secured at the other end to the base 24 for rotation about an axis parallel to the vertical plane of the support plate 18.

The hinge 64 is secured to the tube by a collar 66 which passes around the external surface 68 of the tube near its open end 60. The collar 66 is made fast to the tube, as by welding. The hinge 64 is rotatably secured to the base 24 as best seen in FIG. 4, by rod 70 which extends through in an aperture 72 within the base. A notch 74 cuts through the aperture 72 midway thereof and runs to the truncated section of the side wall 26 of the base 24. The hinge 64 has a transverse aperture 76 distant from the collar 66 and the hinge is received in the notch so as to allow the aperture 76 in the end of the hinge 64 to be in registry with the aperture 72 in the base 24 and to allow the rod 70 to pass through the aperture 76 in the hinge 64. The notch also allows the hinge 64 to rotate unrestrictedly without interference by the base 24. The short horizontal gap on the top edge of the guide wall 30 and the truncated portion 28 of the side wall 26 are provided so as to prevent interference with relative movement of the tube 58.

The tube mounting means further includes a pair of telescoping links 78 connected to the base 24 for rotation about an axis parallel to the axis of rotation of the hinge 64 and parallel to the vertical plane of the support plate 18. The links 78 are rotatably secured at one set of ends to the tube 58 and rotatably secured at the other set of ends to the base member 24. A bracket 80 is attached, as by screws 82, to the base 24 and has twin spaced upstanding ears 84, 86. Each link 78 is identical except for its location (one adjacent each of diametrically opposite sides of the tube) and for convenience, only one link will be structurally detailed.

Such link includes two interacting sections, to wit, an inner section 90 and an outer section 92. The inner section is rotatably secured at one end to one ear 84 of the bracket 80, and has an axis of rotation parallel to the vertical plane of the support plate 18. The inner section is attached to the ear 84 by a headed screw 94 passing through a clear (untapped) aperture in the section 90 and threaded into a tapped aperture in the ear 84.

The outer section 92 has one end rotatably secured to the tube. To this end a collar 96 passes around the external surface 68 of the tube 58 adjacent the blocked end 62 thereof and is made fast to the tube, as by welding. The collar 96 is rotatably secured to the link section 92 by a rod 98 passing transversely internally across and blocking the end 62 of the tube 58, through registered diametrically opposed holes in the tube and through an aperture 101 in the end of the section 92. The ends of the rod are threaded and a threaded cap 102 is screwed onto each such end to rotatably secure the section 92 to the collar 96.

The outer section 92 is hollow, having an elongated internal rectangular passageway running substantially its entire length. The inner section 90 is of matched cross-sectional dimensions and contour, and the free end of this latter section 90 is slidably engaged within the internal passageway within the outer section 92.

Second manually operable lock means, separate from and independent of the first lock means, is provided to selectively fix the angular relationship of the tube 58 to the base 24 by selectively varying the length of the link 78 whose opposite ends are secured to fixed points on the base and tube. For such purpose the outer section 92 has longitudinally disposed on its outward face 104 enlarged circular portions 106 which are part of an elongated longitudinal slot 108, said slot having narrow portions running between the enlarged circular portions 106. The inward face 110 of the section 92 has a parallel aligned coextensive slot 112. As best seen in FIG. 5, the inner link section 90 contains an aperture 114 aligned between the slots 108, 112. A rod such as a headed threaded screw 116 has its shank 118 snugly contained in the aperture 114 in the section 90, with its head 120 slidably fitted in the slot 112. The tip 122 of the shank protrudes through the slot 108 in the outward face 104 of the outer section 92 and is slidably fitted in the narrow portions of said slot. A wing nut 124 is screwed onto the tip 122 of the shank 118 and carries a circular shoulder 126 of the same diameter as the circular portions 106, which, when the wing nut 124 is tightened, seats within any selected desired enlarged portion 106 with which it is brought into registry.

A safety lock 128 is an optional but desirable feature of my invention. The lock 128 comprises a claw member 130 having one end rotatably secured to an upstanding ear 132 fixed to the collar 96 and having on the other end a claw 134 extending into the interior of the tube 58 through a slot 136 in the tube wall. The claw member 130 is biased towards the tube by a leaf spring 138 also mounted on the collar 96. The claw 134 is arranged to engage a ring clamp 140 attached to the rod handle 14. The lock 128 may be situated near the blocked end 62 of the tube 58 as seen in FIG. 3 or near the open end 60 as seen in FIG. 1.

In operation the handle 14 of a fishing rod 16 or trolling pole 16 is seated in the tube 58 whenever desired. The claw 134 of the claw member 130 engages the ring clamp 140 which has been mounted around the handle 14 so that the handle is held securely within the tube 58. When it is desired to withdraw the handle 14 from the tube, the claw member 130 is simply grasped by the hand of the user and pulled away from the tube 58. This disengages the claw 134 from the ring clamp 140, allowing withdrawal of the handle from the tube interior.

The holder 10 is rotatable so that it can hold a fishing rod 16 in a wide variety of angular relations to the boat structure or any vertical wall 12 on which the holder is mounted. This wide variety of angular relationships may be achieved by selective adjustment of the two independent and separate lock means and rotation of certain parts. When the support plate 18 is mounted in a vertical position the base 24 and thus the tube 58 are rotatable about a fixed horiontal axis perpendicular to the vertical plane of the support. To this end, when it is desired to rotate the base 24 about such horizontal axis the head 44 of the pin 42 is pulled outwardly from the guide wall 30 against the force of the spring 52. Thereby the tip 45 of the shaft 46 is withdrawn from the indent 54 with which it is presently aligned. The base 24 thereafter may be rotated within the guide wall 30. The shaft 36 rotatably holds the base 24 within the guide wall 30 and to the support plate 18. When the base 24 has been rotated to a desired position the nearest indent 54 is again aligned with the tip 45 of the shaft 46 and the shaft is biased into such indent by the spring 52. This lock means positively blocks further rotation of the base 24 until such movement is again desired. The solid lines in FIG. 2 indicate one position of the tube 58 (and thus the base 24) in relation to the support plate 18 and the dot-and-dash lines in the same figure show second such position.

The tube 58 is mounted for rotation in relation to the base 24 about an axis parallel to the vertical plane of the support plate 18. Such action is afforded by the hinge 64 and by the telescoping links 78. The hinge 64 rotates on the base 24 and serves as a radius of fixed length to rotate the tube 58 about the base 24. Each telescoping link 78 also rotates with and in respect to the base 24 but itself is an expansible and contractible member so as to act as a radius link of variable length. To rotate the tube 58 on the base 24, the wing nuts 124 are sufficiently counter-rotated off the screw shanks 118 so that the shoulders 126 carried by the wing nuts 124 are drawn outwardly of and therefore are clear of the affiliated enlarged portions 106 on the slots 108 in the sections 92. At this point the screw heads 120 are free to slide in the slots 112 on the inward faces 110 of the outer sections 92 and the shank tips 122 are also free to slide in the slots 108 connecting the enlarged portions 106 on the outward faces 104 of the outer sections 92.

The screws 116 lie in the apertures 114 in the inner sections 90 and therefore are fixed in relation to these sections. When the wing nuts 124 are loosened, as has been described, the shank heads 120 and the shank tips 122 may freely slide so as to allow movement of the inner section 90 within the passageways in the outer sections 92 so as to rotate the tube 58 in relation to the base 24 as desired. After expanding or contracting the links 78 and when it is desired to again fix the lengths of the telescoping links 78, the shoulders 126 are aligned with the desired enlarged portions 106 and then the wing nuts 124 are tightened onto the screws 116. This causes each shoulder 126 to seat within any selected portion 106 and thereby positively block accidental relative rotation of the tube with respect to the base. The position of the tube 58 with the telescoping links 78 partially expanded is illustrated in solid lines in FIG. 3; a position with the links contracted is illustrated in dot-and-dash lines.

It is thus seen that with the combination of rotation between the base 24 and the support plate 18 as well as rotation of the tube 58 in relation to the base 24 the holder 10 may assume a wide variety of positions with respect to a boat.

A second embodiment of my invention is shown in FIGS. 7 and 8. For the sake of simplicity only the differences between the second embodiment and the just described first embodiment will be discussed. The base 24 and the support plate 18 are the same as were shown and described in the first embodiment and similar parts are similarly numbered to avoid redescription. The second embodiment has a different means mounting the tube 58 for rotation on the base 24. This means includes a first hoop 142 slidably secured to the tube 58 and rotatably secured to the base 24. The hoop 142 is in the form of a split constrictable collar 144 which passes around the tube 58. A hinge 64 on the collar 144 is rotatably secured to the base 24 by a shaft 70.

A lock 146 is included in the second lock means which selectively fixes the angular relationship of the tube 58 to the base 24. This lock 146 comprises a threaded shank 148 (see FIG. 8) having a unitary head 150 which is constructed for convenient gripping by the fingers of a user. Each half of the collar 144 after passing around the tube 58 terminates in an ear 152 and each ear 152 contains an unthreaded aperture 154 which is in registry with the other aperture. One aperture is slightly larger than the other and carries an insert 156 swage secured therein. The insert 156 itself has a threaded bore 158 and the lock 146 is disposed so that its head 150 is on one side of the ears 152 and so that the shank 148 freely passes through one aperture and meshes with the insert 156 in the other aperture. When the lock 146 is tightened by rotating the head 150 in one direction, the ears 152 are drawn together and thereby the split collar 144 is frictioanlly clamped onto the external surface 68 of the tube 58. When the lock 146 is rotated in the opposite direction the ears 152 are freed and the split halves of the collar 144 are allowed to spread, by virtue of their resiliency, to their unstressed slightly spaced apart positions and at this point the collar 144 is free to slide along the external surface 68 of the tube 58.

The tube mounting means further includes a link 160 which is of fixed length and has one end rotatably secured to a second hoop 161 disposed about the tube 58 and the other end rotatably secured to the base 24, in the same manner as was detailed for the juncture of the hinge 64 to the base 25 in the first embodiment. The link 160 and the hoop 142 rotate about parallel axes parallel to the vertical plane of the support plate 18. For rotation of the hoop relative to the link the hoop includes a split collar 162 similar in construction to the collar 144 but fixedly disposed about the external surface of the tube 58 and which also carries a manually operable lock 164 similar in construction to the lock 146. However in this instance the ears of the collar 162 straddle the end of the link 160 proximate to the tube 58. This end of the link 160 also has an aperture through wihch the lock 158 passes so that tightening of the lock 164 will tighten the ears about the end of the link 160. A portion 163 of the collar 162 distant from the link 160 is fixedly joined to the tube 58 as by welding.

The base 24 may be rotated in relation to the support plate 18 in this embodiment of my invention in the same manner as described previously. When it is desired to change the angular relationship of the tube 58 to the base 24 the lock 164 is loosened so that the link 160 is free to rotate on the shaft of the lock 164 relative to the collar 162, and the lock 146 is loosened so that the collar 144 is free to slide on the tube 58. The hinge 64 may then rotate on the base 24 and the link 160 will at one end rotate on the base 24 and at the other end rotate with respect to the collar 162. At the same time the collar 144 will slide in either direction along the tube 58 as desired. Movement of the link 160 towards the hoop 142 will approach the longitudinal axis of the tube 58 to the horizontal.

When the locks 146 and 164 are tightened, the collar 144 is frictionally secured to the tube 58 and, respectively, the link 160 is secured against angular movement to the collar 162. The second lock means thus secures the hoops at distant positions along the length of the tube so that the tube can not rotate with respect to the base 24.

In a third embodiment of my invention as seen in FIG. 9, 10 and 11, again the base 24 and the support plate 18 are the same in construction as in the first embodiment, and similar parts are similarly numbered. The third embodiment has included in its tube mounting means a hinge 168 fixed secured at one end to the tube and rotatably secured at the other end to the base 24. The hinge 168 is the same in construction and is joined to the base 24 in the same manner as the hinge 64 shown in the first embodiment. The tube mounting means also includes links 170 of fixed lengths on opposite sides of the tube, selectively securable to the tube 58 at any one of several positions along their lengths and rotatably secured at one set of ends to the base 24; only one link will be detailed for brevity. Each link 170 is joined to the base 24 by a bracket 80 as shown in the first embodiment above described.

The second manually operable lock means for the third embodiment includes an elongated slot 172 disposed along the longitudinal axis of the link 170. The slot 172 includes enlarged circular portions 174 and narrow straight portions 176 which run between and connect the enlarged portions. A shaft 178 passing diametrically through and protruding outwardly from the tube 58, has a head 180 at both of its ends and a shoulder 182 inner of and adjacent to each head 180 and also has a shank 184 between the shoulders disposed traversely through an end 62 of the tube 58 and parallel to the vertical plane of the support plate 18. Each shoulder 182 is spaced from the tube 58 and has a diameter which matches that of the enlarged circular portions 174. The shank 184 of the stud 178 has a diameter smaller than the width of the narrow portions 176 of the slot 172. An end of the stud 178 passes through the slot 172 in the link 170 and the head 180 of the stud 178 holds the link 170 between the head 180 and the tube 58.

Each link 170 is securable to the tube 58 positively (not depending on friction) at any one of several positions along its length, each such position corresponding to a different one of the enlarged portions 174 in the elongated slot 172. When the link is secured to the tube 58, the shoulder 182 is seated within any one enlarged portion 176 of the slot 172.

Each link is resilient and is held by the bracket 80 at one end so that it is biased toward a first outward position in which any one enlarged portion 174 engages the shoulder 182 on the stud 178, this first position being the one in which the link 170 is in repose.

The link 170 can be flexed toward a second and inward position, away from the shoulder 182 and toward the tube 58. When the link 170 is flexed toward the tube 58, the enlarged portion 174 is clear of the shoulder 182 so that the shank 184 of the stud 178 which protrudes from the tube 58 can freely slide within the slot 172.

Thus when the link 170 is non-shiftably secured to the tube 58, the enlarged portion 174 of the slot 172 receives the shoulder 182 of the stud 178, the link 170 being biased towards this position. Such engagement fixes the angular position of the tube 58 in relation to the base 24. When it is desired to rotate the tube 58 relative to the base 24, the links 170 are flexed toward the tube, as by the hands of the user, thus clearing the enlarged portions 174 of the shoulders 182, and the shanks 178 are then free to slide in the slots 172. The positions of the links in repose and as flexed are shown respectively in solid and dot-and-dash lines in FIG. 9.

With the links flexed toward the tube 58, the tube 58 can be rotated by means of the hinge 168 rotating on the base 24 and by means of the stud 184 sliding in the slots 172; when another desired position is reached, the links are biased by their resiliency towards their outward positions of repose in which another registered pair of enlarged portions 174 engages the shoulders 182. As seen in FIG. 10 in solid lines, when the shoulders 182 engage the endmost enlarged portions, the tube 58 approaches an axis perpendicular to the vertical plane of the support plate 18. As seen in dot-and-dash lines, when the shoulders 182 engage the innermost enlarged portions 174, the tube 58 lies on an axis parallel to the vertical plane of the support plate 18.

In a fourth embodiment of my invention as seen in FIGS. 12 and 13, the means mounting the tube 58 on the base 24 includes a hinge 183 fixedly secured to the tube 58 by a collar 185 which passes about the external surface of the tube and which is made fast to the tube as by welding. The hinge 183 is rotatably secured to the base 24, being rotatable about an axis parallel to the vertical plane of the support plate 18, and is joined to the base 24 by a rod 70 and notch 74 arrangement the same in construction as that which joins the hinge 64 to the base 24 in the first embodiment except that the same are located at a lower level.

The second lock means in this embodiment includes a brace in the form of a yoke 186 fixed to the base 24. The yoke has two parallel arms 188, 190 between which the hinge 183 rotates.

The hinge 183 when rotated describes an arcuate path and the hinge is selectively securable to the brace 186 in any selected one of several positions along its path. The arms 188, 190 have aligned peripheral radial notches 192 corresponding to each one of these positions. The hinge 183 carries a transverse movable bar 194 parallel to the vertical plane of the support plate 18. The intermediate portion of the bar 194 is movable radially in a slot 196 in the hinge 183 and the ends of the bar 194 protrude from the hinge 183 and can be seated in any selected pair of aligned notches 192. A piston 198 is attached to the bar 194 and is urged by a spring 200 housed in a chamber 202 in the hinge 183 toward the base 24 thereby urging the ends of the bar 194 into the notches 192 on the yoke arms 188, 190.

When the ends of the bar 194 are seated in the notches 192, the hinge 183 is positively fixed (blocked) in angular position relative to the yoke 186 thereby locking the position of the tube 58 relative to the base 24. When it is desired to rotate the tube 58 relative to the base 24, the bar 194 is moved, as by the hand of a user, towards the tube 58 against the force of the spring 200. Such movement clears the ends of the bar of the notches 192 and thereafter the hinge 183, and thus the tube 58, may be rotated to any other desired angular position relative to the base 24. When another position is reached, the spring 200 is again permitted to urge the bar ends to seat in another set of aligned notches 192. As will be seen in FIG. 12, the tube may be rotated from a position (solid lines) parallel to the vertical plane to a position (dot-and-dash lines) approaching an axis perpendicular to the vertical plane of the support plate 18.

It thus will be seen that I have provided devices which achieve the several objects of my invention and which are well adapted to meet the conditions of practical use.

As various possible embodiments might be made of the above invention, and as various changes might be made in the embodiments above set forth, it is to be understood that all matter herein set forth or shown in the accompanying drawings is to be interpreted as illustrative and not in a limiting sense.

I claim:
1. A fishing rod and trolling pole holder comprising:
   (a) a flat support plate adapted to be secured to a surface on a boat,
   (b) a base comprising a flat plate having a cylindrical slide wall and a central through-bore,
   (c) means mounting said base on the support plate for rotation about a fixed axis perpendicular to the plane of the support plate,
   (d) said mounting means comprising a guide wall having an interior cylindrical bearing face, said guide wall being fixed on the support plate on the exposed face thereof opposite from the face against the surface of the boat, the diameter of said cylindrical bearing face matching the diameter of the cylindrical side wall of the base and being rotatably slidably engaged therewith, and a headed shaft including a shank in the through-bore in the base and detachably connected to said support plate with the head of the shaft bearing against the base, (e) first manually operable lock means selectively fixing the angular relationship of the base to the support plate, (f) said first lock means comprising a plurality of indents in the side wall of the base, a manually operable pin carried by the support plate and mounted for movement on said support plate between a first position wherein the tip of the pin is within any selected one of said indents so as to lock the base to the support plate and a second position wherein the tip is clear of said indents so as to allow rotation of the base relative to the support plate, (g) means selectively retaining the pin in its first position, (h) an elongated tube having an open end and a blocked end and adapted to receive a rod or pole handle, (i) means mounting the tube on said base for pivotal movement relative thereto about an axis parallel to the plane of support plate, (j) said tube turning with the base about the fixed axis perpendicular to the plane of the support plate, (k) said pin being located radially outwardly of the base out of the path of travel of the tube relative to the support plate, and (l) second manually operable lock means separate from and independent of the first lock means and selectively fixing the angular relationship of the tube to the base, (m) so that the tube is selectively lockable about both said axes in a variety of angular relationships relative to the boat whereby a fishing rod or trolling pole can be secured in a desired position.

2. A fishing rod and trolling pole holder as set forth in claim 1 wherein the tube mounting means and the second manually operable lock means includes:

(a) a hinge fixedly secured to the tube and rotatably secured to the base, (b) a link of fixed length securable to the tube at any one of several predetermined positions along the length of said link and rotatably secured at one end to the base, said link being rotatable relative to the base about an axis parallel to the axis of rotation of the hinge, (c) an elongated slot disposed along the longitudinal axis of and on the link, said slot including enlarged portions and narrow portions connecting said enlarged portions, each enlarged portion corresponding to one of said several predetermined positions, and (d) a stud having a shouldered end protruding from and spaced from the tube, the shoulder of the stud being engageable in locking positions within any one enlarged portion of the slot to secure the tube in any selected predetermined position to the link, the link being resilient and being biased toward said locking position, the shoulder of the stud being disengageable from the slot by resilient flexing movement of the link away from said shoulder and toward the tube thereby permitting the shank of the stud to slide within the slot along the narrow portions thereof as the tube is moved from one predetermined position to another along the link.

References Cited by the Examiner

UNITED STATES PATENTS

| | | | |
|---|---|---|---|
| 278,973 | 6/83 | Kizer | 248—40 |
| 314,290 | 3/85 | Haitz | 248—40 |
| 419,137 | 1/90 | Robemerith | 248—40 |
| 877,802 | 1/08 | Shuster | 248—40X |
| 1,035,739 | 8/12 | Raes | 248—40 |
| 1,985,985 | 1/35 | Geraline | 248—40X |
| 2,055,842 | 9/36 | Hailslip | 248—42 |
| 2,312,957 | 3/43 | Cannon | 248—42 |
| 2,506,824 | 5/50 | Brown et al. | 248—42 |
| 2,507,650 | 5/50 | Seiple | 248—40 |
| 2,540,584 | 2/51 | Jaycox | 248—42 |
| 2,576,624 | 11/51 | Miller | 248—42 |
| 2,935,284 | 3/60 | Reeves | 248—208 |
| 2,967,687 | 1/61 | Glusik | 248—4 |
| 3,063,668 | 11/62 | Yohe | 248—279 |

CLAUDE A. LE ROY, *Primary Examiner.*